(12) United States Patent
Kim

(10) Patent No.: US 9,198,459 B2
(45) Date of Patent: Dec. 1, 2015

(54) JUICE EXTRACTION MODULE FOR JUICER

(71) Applicants: Nuc Electronics, Co., Ltd., Daegu (KR); Ji Tae Kim, Daegu (KR)

(72) Inventor: Jong Boo Kim, Daegu (KR)

(73) Assignees: NUC Electronics Co., Ltd., Daegu (KR); Ji Tae Kim, Daegu (KR)

( * ) Notice: Subject to any disclaimer, the term of this patent is extended or adjusted under 35 U.S.C. 154(b) by 0 days.

(21) Appl. No.: 14/532,911

(22) Filed: Nov. 4, 2014

(65) Prior Publication Data

US 2015/0053098 A1 Feb. 26, 2015

Related U.S. Application Data

(63) Continuation of application No. 14/199,849, filed on Mar. 6, 2014, which is a continuation of application No. 13/858,838, filed on Apr. 8, 2013, now Pat. No. 8,770,100.

(30) Foreign Application Priority Data

Nov. 9, 2012 (KR) .................... 10-2012-0126516
Dec. 18, 2012 (KR) .................... 10-2012-0148417

(51) Int. Cl.
*A23N 1/00* (2006.01)
*A23N 1/02* (2006.01)
*A47J 19/02* (2006.01)

(52) U.S. Cl.
CPC *A23N 1/02* (2013.01); *A47J 19/025* (2013.01)

(58) Field of Classification Search
CPC ....... A23N 1/02; A23N 12/086; A23N 1/003; B02C 18/24; B02C 4/286; A23L 2/06
See application file for complete search history.

(56) References Cited

U.S. PATENT DOCUMENTS

| | | | |
|---|---|---|---|
| 1,906,054 | A | 4/1933 | Freese |
| 2,304,929 | A | 12/1942 | Keith |
| 4,440,074 | A | 4/1984 | Ihara et al. |
| 5,669,289 | A | 9/1997 | Chen |
| 5,906,154 | A | 5/1999 | Yoon et al. |
| 5,970,860 | A | 10/1999 | Yip |
| 6,604,455 | B2 | 8/2003 | Areh et al. |
| 6,637,323 | B2 | 10/2003 | Kim |
| 7,461,801 | B2 | 12/2008 | Chang |
| 8,091,473 | B2 | 1/2012 | Kim |

(Continued)

FOREIGN PATENT DOCUMENTS

| | | |
|---|---|---|
| CN | 201052066 Y | 4/2008 |
| CN | 201290617 Y | 8/2009 |

(Continued)

*Primary Examiner* — Dana Ross
*Assistant Examiner* — Renee L Miller
(74) *Attorney, Agent, or Firm* — Seed IP Law Group PLLC

(57) ABSTRACT

A juice extraction module for a juicer is provided, which includes a container formed with a juice discharge port, a sieve positioned inside of the container, a screw positioned inside of the sieve to extract juice from a material, and a lid coupled to a top end of the container and formed with a input port through which the material is input. The juice extraction module includes a crushing portion formed on a top end of the screw to be narrowed upward, the crushing portion having a crushing blade formed thereon; and a crushing processing portion connected to the input port and formed in a bottom of the lid to be concave for accommodating the crushing portion.

2 Claims, 4 Drawing Sheets

(56) References Cited

U.S. PATENT DOCUMENTS

| | | |
|---|---|---|
| 2004/0231529 A1 | 11/2004 | Jan |
| 2008/0196599 A1 | 8/2008 | Bhagat |
| 2009/0049998 A1 | 2/2009 | Kim |
| 2012/0227592 A1 | 9/2012 | Lim et al. |

FOREIGN PATENT DOCUMENTS

| | | |
|---|---|---|
| CN | 201596556 U | 10/2010 |
| CN | 2497393 U | 3/2011 |
| CN | 102670042 A | 9/2012 |
| CN | 103202653 A | 7/2013 |
| EP | 2497393 A1 | 9/2012 |
| EP | 2510842 A2 | 10/2012 |
| FR | 2967034 A1 | 5/2012 |
| JP | 40-3104 | 1/1940 |
| JP | 2-6522 B2 | 2/1990 |
| JP | 06-319505 | 11/1994 |
| KR | 20-1993-0012778 U | 7/1993 |
| KR | 10-1995-0000072 B1 | 1/1995 |
| KR | 20-1995-0013027 | 6/1995 |
| KR | 20-1996-0000061 Y1 | 1/1996 |
| KR | 20-1996-0003085 Y1 | 4/1996 |
| KR | 10-1996-0016782 A | 6/1996 |
| KR | 20-1999-0016788 | 5/1999 |
| KR | 10-2000-0074261 A | 12/2000 |
| KR | 10-2001-0012045 A | 2/2001 |
| KR | 10-0285120 B1 | 3/2001 |
| KR | 10-2002-0059458 A | 7/2002 |
| KR | 20-0322266 | 7/2003 |
| KR | 20-0376615 | 2/2005 |
| KR | 20-0392588 Y1 | 8/2005 |
| KR | 10-2005-0101127 A | 10/2005 |
| KR | 10-2006-0025924 A | 3/2006 |
| KR | 10-0793852 | 9/2006 |
| KR | 10-0755440 B1 | 9/2007 |
| KR | 10-0966607 B1 | 6/2010 |
| KR | 10-2012-0029640 A | 3/2012 |
| KR | 10-2012-0042606 A | 5/2012 |
| KR | 1020120054572 A | 5/2012 |
| WO | 2010/007290 A2 | 1/2010 |
| WO | 2012/108588 A1 | 8/2012 |
| WO | 2013/053228 A1 | 4/2013 |

JUICE EXTRACTION MODULE FOR JUICER

BACKGROUND

1. Technical Field

The present disclosure relates to a juice extraction module for a juicer, and more specifically, to a juice extraction module for a juicer having an improved structure capable of eliminating the inconvenience that a material should be chopped before the material is input into the juicer.

2. Description of the Related Art

In general, a juicer includes a main body, and a juice extraction module mounted onto the main body. The juice extraction module includes a container having a juice extraction space, a lid having an input port through which a material is input into the container, a screw for extracting juice from the material in the container, and a sieve for separating juice and residues from each other.

The main body includes a driving motor for rotating the screw, and a shaft of the driving motor is connected to the screw in the juice extraction module. In the conventional juicer, the material should be chopped into such a size that the screw can extract juice.

As an example, Korean Patent No. 10-0793852 discloses a juicer configured to cut or sever a material by a screw blade protruding from a central axis of a screw toward a lateral side of an uppermost end.

However, in the above technique, when a material has a size larger than the length of the screw blade, the material should be chopped in advance into a size smaller than the length of the screw blade.

In addition, Korean Patent No. 10-0966607 discloses a juicer having a grater provided in an entire upper surface over a screw to crush a material just before juice is extracted.

However, there are problems in that the crush using the grater is achieved at a speed higher than an ordinary low speed of the juicer and also a user should press the material against the grater by a large force in order to prevent the rotation of the material due to the high speed of the grater.

Also, since the conventional juicer cuts the material and then mills the cut pieces of the material while they are pressed against a sieve in a juice extraction process, the sieve may be deformed in a moment by the pressed cut pieces.

Such deformation destroys a molding for holding a shape of the sieve or decreases the bond between the molding and the sieve to generate a gap between the molding and the sieve causing a leakage of residues and a decrease in juice extraction efficiency.

BRIEF SUMMARY

Embodiments of the present invention provide a juice extraction module for a juicer, in which a structure of crushing a material in advance is provided in a lid and a screw to eliminate an inconvenient procedure of chopping or cutting a material in advance before inputting the material.

According to an aspect of the present invention, there is provided a juice extraction module for a juicer, which includes a container 100 formed with a juice discharge port 101, a sieve 200 positioned inside of the container 100, a screw 300 positioned inside of the sieve 200 to extract juice from a material, and a lid 400 coupled to a top end of the container 100 and formed with a input port 410 through which the material is input.

The juice extraction module includes a crushing portion 500 formed on a top end of the screw 300 to be narrowed upward, the crushing portion 500 having a crushing blade 510 formed thereon; and a crushing processing portion 600 connected to the input port 410 and formed in a bottom of the lid 400 to be concave for accommodating the crushing portion 500, wherein the crushing blade 510 crushes the material in advance within the crushing processing portion 600.

According to one embodiment, the crushing blade 510 is formed so that the material input through the input port 410 is crushed while a lateral side of the material is pushed outwards, and the crushing processing portion 600 is provided with an inner surface to hold the material pushed outwards by the crushing blade 510, whereby the material can be crushed between the crushing blade 510 and the inner surface of the crushing processing portion 600.

According to one embodiment, the crushing processing portion 600 is formed to cover an entire bottom region of the input port 410 at the height of the crushing processing portion 600 connected to a bottom end of the input port 410.

According to one embodiment, a bottom region of the input port 410 is positioned to be offset within a semicircle region of a circle having a diameter corresponding to a diameter of the crushing processing portion 600 with a central shaft 310 of the screw 300 as a center.

According to one embodiment, the inner surface of the crushing processing portion 600 comprises a crushing processing surface 610 formed to be gradually close to the crushing blade 510 in a direction in which the crushing blade 510 runs from the input port 410.

According to one embodiment, the inner surface of the crushing processing portion 600 comprises a material guide surface 620 continuing from the input port 410 and formed to be inclined toward a central axis of the crushing portion 500, whereby the material guide surface 620 guides the material so that a lateral side of the material begins to be crushed by the crushing blade 510.

According to one embodiment, a bottom end of the material guide surface 620 may conform to an inner surface of the sieve 200.

According to one embodiment, the crushing portion 500 passes over a top end of the sieve 200 and is accommodated in the crushing processing portion 600, and the crushing blade 510 cooperates with the crushing processing portion 600 to crush the material.

According to another aspect of the present invention, there is provided a juice extraction module for a juicer, which includes a container 100 formed with a residue discharge port 102 and a juice discharge port 101; a sieve 200 positioned inside of the container 100; a screw 300 positioned inside of the sieve 200 to extract juice from a material, and a lid 400 coupled to a top end of the container 100 and formed with a input port 410 through which the material is input, wherein a crushing portion 500 is formed on a top end of the screw 300 to be narrowed upward, the crushing portion 500 having a crushing blade 510 formed thereon, wherein the lid 400 is formed with a crushing processing portion 600, the crushing processing portion 600 being connected to the input port 410 and accommodating the crushing portion 500, wherein the input port 410 is disposed to be offset outwards from a central axis of the screw 300 and has a width larger than the shortest distance from the central axis of the screw 300 to an inner circumferential surface of a top end of the sieve 200, wherein the crushing processing portion 600 is formed with a material guide surface for assisting guidance of the material from the input port 410 to the sieve 200.

The crushing blade 510 and the crushing processing portion 600 are formed so that a distance between the crushing blade 510 and an inner surface of the crushing processing portion 600 is gradually reduced by the rotation of the crushing blade 510

The crushing processing portion 600 comprises a crushing processing surface 610, the crushing processing surface 610 is formed with at least one milling blade 630.

A conventional juicer has inconvenience and difficulty in that an increase in length of a screw blade increases an entire outer diameter of a screw, and thus, a sieve, a container and a lid should be manufactured large so as to be fitted to the screw. However, according to embodiments of the present invention, a material having a diameter larger than a length of a screw blade can be used, and the material can be crushed into a size suitable for extracting juice without increasing an outer diameter of a screw by a crushing processing portion formed to be concave in a bottom of a lid and a crushing portion accommodated in the crushing processing portion and cooperating with the crushing processing portion.

Thus, embodiments of the present invention eliminate the inconvenience and cumbersomeness that a user should chop a material before the material is input.

In addition, a space between the crushing blade and the crushing processing portion is gradually narrowed and the material is caught and simultaneously dragged into between the crushing blade and the crushing processing portion, so that the material is effectively crushed while being automatically supplied to the screw without inconveniently pushing the material.

DETAILED DESCRIPTION

Figure 1:
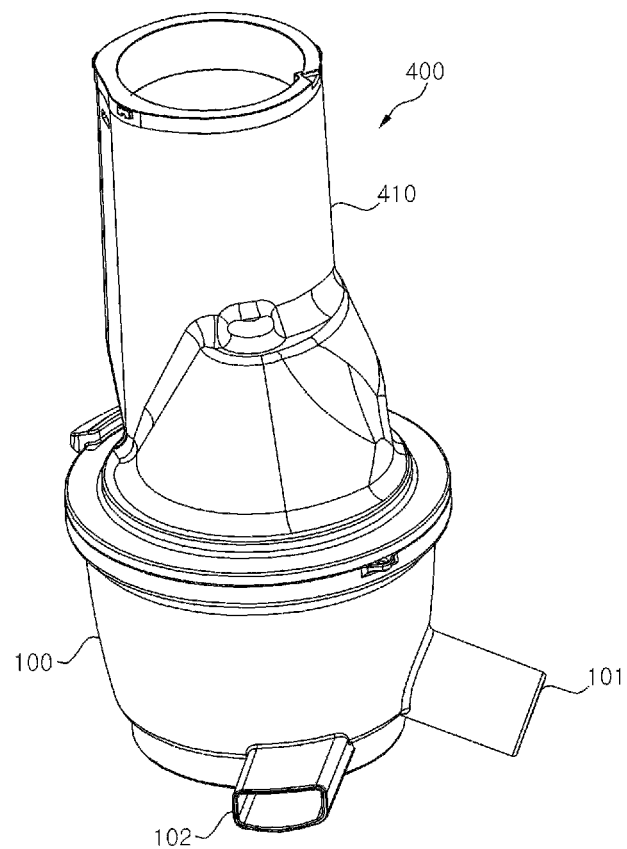
FIG. 1 is a perspective view showing a juice extraction module for a juicer according to one embodiment of the present invention.

Hereinafter, preferred embodiments of the present invention will be described in detail with reference to the accompanying drawings.

The following embodiments are provided only for illustrative purposes.

Therefore, the present invention is not limited to the following embodiments but may be implemented in other forms.

In the drawings, the widths, lengths, thicknesses and the like of elements may be exaggerated for convenience of illustration.

Figure 2:
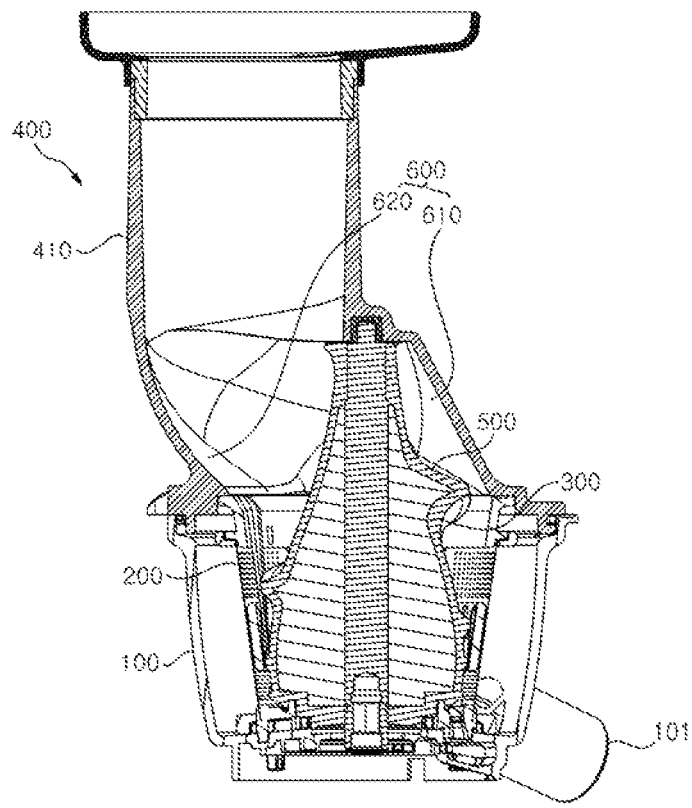
FIG. 2 is a sectional view showing the juice extraction module according to the embodiment of the present invention.
Figure 3:
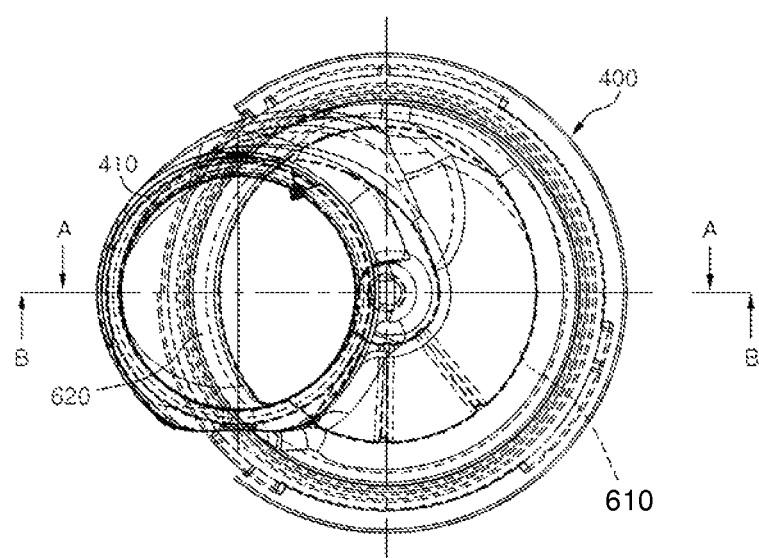
FIG. 3 is a plan view showing a lid of the juice extraction module shown in FIG. 1.
Figure 4:
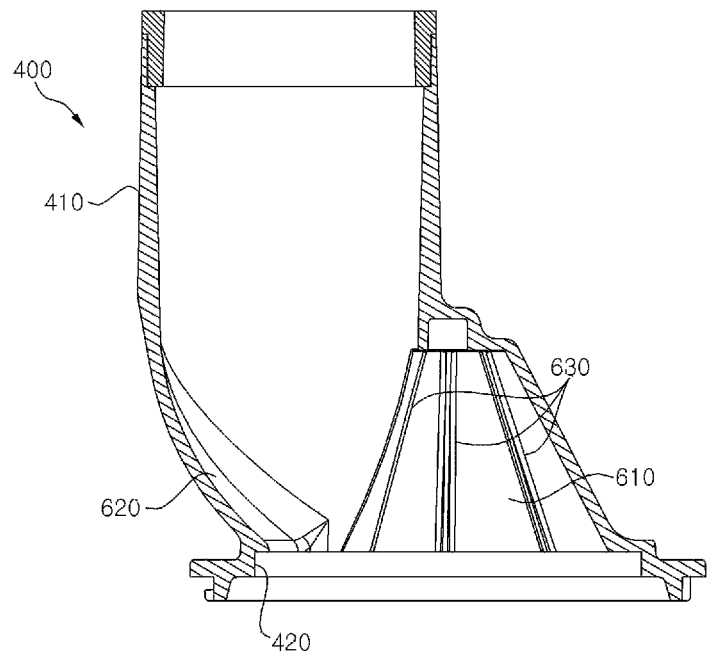
FIG. 4 is a sectional view of the lid taken along line A-A of FIG. 3.
Figure 5:
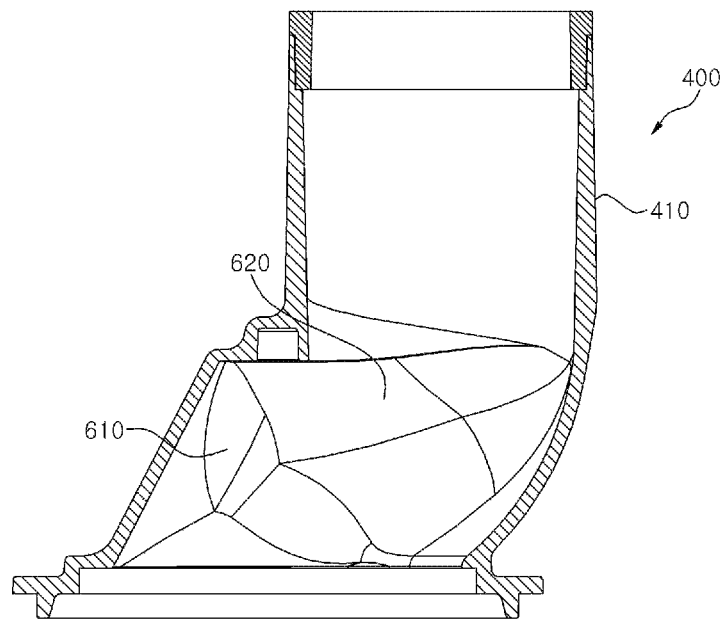
FIG. 5 is a sectional view of the lid taken along line B-B of FIG. 3.
Figure 6:
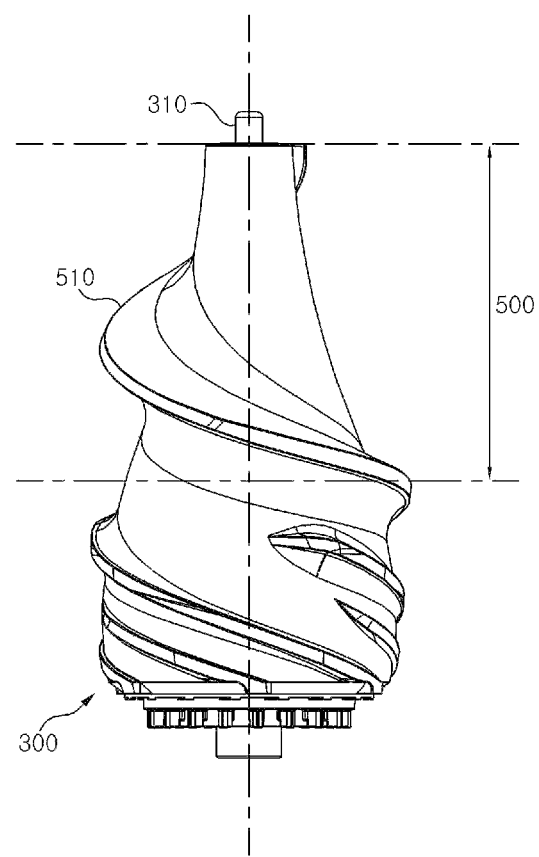
FIG. 6 is a front view showing a screw having a crushing portion provided on a top end thereof as a portion of juice extraction module shown in FIG. 1.

FIG. 1 is a perspective view showing a juice extraction module for a juicer according to one embodiment of the present invention; FIG. 2 is a sectional view showing the juice extraction module according to the embodiment of the present invention; FIG. 3 is a plan view showing a lid of the juice extraction module shown in FIG. 1; FIG. 4 is a sectional view of the lid taken along line A-A of FIG. 3; FIG. 5 is a sectional view of the lid taken along line B-B of FIG. 3; and FIG. 6 is a front view showing a screw having a crushing portion provided on a top end thereof as a portion of juice extraction module shown in FIG. 1.

Referring to FIGS. 1 to 6, a juice extraction module for a juicer according to one embodiment of the present invention includes a container 100 having a juice extraction space defined therein and having a juice discharge port 101 and a residue discharge port 102 respectively formed in one and another sides of an outer surface thereof, a sieve 200 installed inside of the container 100 to separate juice from material residues generated in juice extraction, a screw 300 installed inside of the sieve 200 to extract juice from the material, and a lid 400 installed to a top end of the container 100 and formed with an input port 410, through which a material is input.

Although not shown, an opening/closing means for selectively opening and closing the juice discharge port 101 of the container 100 may be applied to the juice extraction module.

As the opening/closing means, a cock valve may be used. The cock valve includes a valve body moving forward or backward in the juice discharge port 101, wherein a leading end of the valve body is preferably oriented toward the juice discharge port 101.

In addition, the cock valve may include a juice discharge cock, which may be selectively connected to the juice discharge port 101 by the valve body.

As a means for opening and closing the juice discharge port 101, a variety of means may be employed in addition to the above structure.

A crushing portion 500 is formed on a top end of the screw 300 to have a shape narrowed upward.

The crushing portion 500 has further a crushing blade 510 formed thereon, wherein the crushing blade 510 extends in the shape of a spiral having a width gradually narrowed upward, more preferably toward a top apex of the crushing portion 500.

A central shaft 310 of the screw 300 may be formed on the top apex of the crushing portion 500.

The lid 400 has a crushing processing portion 600 formed in a bottom thereof to be concave upward from a face coupled with the container 100 in order to accommodate the crushing portion 500.

The crushing processing portion 600 has a shape gradually narrowed toward a top apex corresponding to the crushing portion 500.

In addition, the top apex of the crushing processing portion 600 is formed with a shaft hole, into which the central shaft 310 of the screw 300 is rotatably fitted.

While being connected with the input port 410, the crushing processing portion 600 cooperates with the crushing portion 500 to serve to crush the material input through the input port 410.

The crushing blade 510 is inserted and positioned in the crushing processing portion 600, and the crushing blade 510 cooperates with a specific shape of an inner surface of the crushing processing portion 600 to crush the material.

The input port 410 is offset toward one side with respect to a central axis of the screw 300 and simultaneously should have such a large bottom width W (or inner diameter) that a large-sized material such as an apple is allowed to be input without being chopped.

The sieve 200 has the largest inner diameter at the top end thereof, and thus, a distance from the central axis of the screw 300 to the sieve 200 is set up to be largest at the top end of the sieve 200.

The bottom width of the input port 410 is set up to be larger than the shortest distance from the central axis of the screw 300 to an inner circumferential surface of the top end of the sieve 200.

Accordingly, as viewed from the top, a region of the input port 410 partially overlaps with a top end region of the sieve 200 and is out of the top end region of the sieve 200.

Embodiments of the present invention have a large difference in that a conventional juicer has a small-sized input port so as to be generally positioned inside of a region of a sieve.

Also, the crushing processing portion 600 is formed to cover the entire bottom region of the input port 410 at the height of the crushing processing portion 600 connected to the bottom end of the input port 410.

Further, the input port 410 is within a circle region having a diameter corresponding to the diameter of the crushing processing portion 600 with the central shaft 310 of the screw 300 as the center, and more preferably, is positioned to be offset within one side of semicircle regions into which the circle region is divided by a line passing through the central shaft 310.

In addition, the inner surface of the crushing processing portion 600, particularly an inner crushing processing surface 610 is formed to be gradually close to the crushing blade 510 of the crushing portion 500 in a direction in which the crushing blade 510 runs from the bottom end of the input port 410.

Accordingly, when the material is expelled out by the crushing blade 510, the material is held by the inner surface of the crushing processing portion 600, so that a lateral side of the material is crushed by the crushing blade 510, and the material is dragged into the crushing processing portion according to the rotation of the crushing portion.

This provides an effect of automatically crushing the material even if a user inputs the material and then does not push the material again.

The crushing portion 500 further has one or more auxiliary crushing blades formed thereon so that they assist the crushing blade 510 to crush the material more effectively.

In such a case, the crushing blade 510 first crushes the material, and the auxiliary crushing blades may crush the material more finely.

Also, as the material is dragged into the crushing processing portion, the force of pressing the screw downward is generated, so that there is an effect of suppressing the upward movement of the screw generated by permeation of material residues between a bottom surface of the screw and a floor surface of the container.

As mentioned above, since a portion of the input port 410 extends out of the top end region of the sieve 200, a material guide surface 620 is provided on the inner surface of the crushing processing portion 600 so that the material input through the input port 410 can be guided to the sieve 200.

That is, the material guide surface 620 is provided as an element for smoothly connecting the sieve 200 and the input port 410 extending to the outside to such an extent as to use an uncut apple as it is.

Also, the material guide surface 620 continues from the input port 410 while overlapping with the input port 410 and is formed to be inclined toward the central axis of the crushing portion 500, thereby causing a lateral side of the material to begin to be crushed by the crushing blade 510.

In order to improve crushing processibility, one or more milling blades 630 may be further formed on the crushing processing surface 610.

In this embodiment, the plurality of milling blades 630 are spaced apart from each other and extend from an upper portion of the crushing processing surface 610 to a lower portion thereof, and each of the milling blades 630 is gradually close to the crushing blade 510 as it goes from the upper portion toward the lower portion.

The crushing portion 500 passes over the top end of the container 100 and sieve 200 and is accommodated and positioned in the crushing processing portion 600 positioned in the lid 400. The crushing portion 500 and the crushing processing portion 600 cooperate with each other to fully crush the material input through the input port 410, thereby making it possible to smoothly extract juice from the material even if the user does not chop the material in advance.

Since the juice is extracted from the material fully crushed as above in the sieve 200, there is an effect of preventing the sieve 200 from being deformed.

In addition, a lateral side of the material is processed by the crushing blade 510, which can be performed only by forming the crushing portion 500 to have a length suitable for the height of the material. Thus, the protruding length of the screw blade need not extend in order to cut the material itself.

Further, a sieve insertion step 420 may be formed in a bottom of the crushing processing portion 600 to be snugly fitted to the top end of the sieve 200.

The bottom end of the material guide surface 620 meets the sieve insertion step 420 in a stepwise manner, wherein the bottom end of the material guide surface 620 is formed to conform to an inner surface of the top end of the sieve 200.

Accordingly, the material crushed through the crushing processing portion 600 is smoothly guided into the sieve 200 along the material guide surface 620.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A juice extraction module for a juicer, which includes a container formed with a juice discharge port, a sieve positioned inside of the container, a screw positioned inside of the sieve to extract juice from a material, and a lid coupled to a top end of the container and formed with a input port through which the material is input, the juice extraction module comprising:

a crushing portion formed on a top end of the screw to be narrowed upward, the crushing portion having a crushing blade formed thereon; and a crushing processing portion connected to the input port and formed in a bottom of the lid to be concave for accommodating the crushing portion, wherein the crushing blade crushes the material in advance within the crushing processing portion, wherein the crushing blade is formed so that the material input through the input port is crushed while a lateral side of the material is pushed outwards, and the crushing processing portion is provided with an inner surface to hold the material pushed outwards by the crushing blade, whereby the material is crushed between the crushing blade and the inner surface of the crushing processing portion, wherein the crushing processing portion covers an entire bottom region of the input port at the height of the crushing processing portion connected to a bottom end of the input port, wherein the inner surface of the crushing processing portion comprises a material guide surface continuing from the input port and formed to be inclined toward a central axis of the crushing portion, whereby the material guide surface guides the material so that a lateral side of the material begins to be crushed by the crushing blade.

2. The juice extraction module according to claim 1 wherein a bottom end of the material guide surface conforms to an inner surface of the sieve.

\* \* \* \* \*